(12) United States Patent
Parizi et al.

(10) Patent No.: US 9,378,132 B2
(45) Date of Patent: Jun. 28, 2016

(54) SYSTEM AND METHOD FOR SCANNING FLASH MEMORIES

(71) Applicant: STEC, Inc., Santa Ana, CA (US)

(72) Inventors: Hadi Torabi Parizi, Irvine, CA (US); Dillip K. Dash, San Diego, CA (US); Namhoon Yoo, Buena Park, CA (US); Umang Thakkar, San Diego, CA (US)

(73) Assignee: HGST TECHNOLOGIES SANTA ANA, INC., Santa Ana, CA (US)

( * ) Notice: Subject to any disclaimer, the term of this patent is extended or adjusted under 35 U.S.C. 154(b) by 286 days.

(21) Appl. No.: 13/843,218

(22) Filed: Mar. 15, 2013

(65) Prior Publication Data

US 2013/0254467 A1 Sep. 26, 2013

Related U.S. Application Data

(60) Provisional application No. 61/614,454, filed on Mar. 22, 2012.

(51) Int. Cl.
*G06F 12/02* (2006.01)
*G06F 3/06* (2006.01)

(52) U.S. Cl.
CPC .......... *G06F 12/0246* (2013.01); *G06F 3/0614* (2013.01); *G06F 3/0659* (2013.01); *G06F 3/0688* (2013.01); *G06F 2212/7208* (2013.01)

(58) Field of Classification Search
None
See application file for complete search history.

(56) References Cited

U.S. PATENT DOCUMENTS

| 8,904,082 | B1 * | 12/2014 | Brahmadathan et al. | ...... 711/103 |
| 2008/0082750 | A1 * | 4/2008 | Okin et al. | ...................... 711/115 |
| 2012/0036308 | A1 * | 2/2012 | Swanson et al. | .................. 711/1 |

* cited by examiner

*Primary Examiner* — Adam M Queler
*Assistant Examiner* — Tracy Chan
(74) *Attorney, Agent, or Firm* — McDermott Will & Emery LLP

(57) ABSTRACT

A system and method for providing memory device readiness to a memory controller is disclosed. One example system includes a channel controller operably connected to a memory controller and a group of flash memory devices. The channel controller may receive, from the memory controller a request for a status of one or more memory devices in the group of flash memory devices. The channel controller may determine the status of the one or more memory devices, the status being determined while the memory controller is permitted to execute one or more other commands related to one or more other memory devices in a different group of memory devices. On determining that the one or more memory devices are in a ready status, the channel controller may provide the ready status to the memory controller.

20 Claims, 4 Drawing Sheets

SYSTEM AND METHOD FOR SCANNING FLASH MEMORIES

The present application claims priority benefit under 35 U.S.C. §119(e) from U.S. Provisional Application No. 61/614,454, filed Mar. 22, 2012, which is incorporated herein by reference in its entirety.

BACKGROUND

The subject technology generally relates to flash memory devices. In solid state drive (SSD) implementations, a flash channel communicates with one or more flash memory devices. A flash controller and a physical layer (PHY) interface may be implemented to initiate and manage communications between a host and the flash memory devices. The flash controller may have both a command and a data interface to facilitate the execution of commands and to meet a predetermined MIPS (millions of instructions per second) requirement.

SUMMARY

A method for providing memory device readiness is disclosed. In one aspect, the method may include initiating, by a processor (for example, a memory controller), one or more memory commands to one or more selected memory units in a first group of memory units, receiving, at a channel controller operably connected to the memory controller and the first group of memory units, a request for a status of the one or more memory units, determining, by the channel controller, the status of the one or more selected memory units, the status being determined while the memory controller is permitted to execute one or more other commands related to one or more other memory units in a different group of memory units, and, on determining that the one or more memory units are in a ready status, providing the ready status to the memory controller. In another aspect, a machine-readable medium may include instructions stored thereon that, when executed by a processor, perform the previously described method.

A system may include a first group of flash memory units, a processor operable to initiate one or more memory commands to one or more selected memory units in the first group of memory units, and a channel controller operably connected to the processor and the group of flash memory devices. The controller may be operable to receive from the processor, at a channel controller operably connected between the processor and the first group of memory units, a request for a status of the one or more selected memory units, determine the status of the one or more selected memory units, the status being determined while the processor is permitted to execute one or more other commands related to one or more other memory units in a different group of memory units, and, on determining that the one or more selected memory units are in a ready status, provide the ready status to the processor.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology may be practiced without these specific details. In some instances, structures and components are shown in block diagram form in order to avoid obscuring the concepts of the subject technology. Like components are labeled with identical element numbers for ease of understanding.

Flash memory is normally manufactured by a third party and/or provided by memory vendors. In some aspects, a flash memory device (for example, a flash memory die) may communicate (at the board level) with a flash controller of a solid state device (SSD). Due to this nature, the flash controller should know the current status of memory. A flash memory device provides status of commands before and after execution, which may have an implication on the bandwidth and power requirements of the SSD. For example, a flash memory die may provide a status (for example, RDY/BSY) pin that returns a "ready" status of the die when the die is ready to accept commands. The status pin may be used by a SSD controller to poll the current status of the flash memory die. But, a SSD may contain multiple channels of flash memory, each channel including multiple flash memory die (for example 32) to support a greater storage requirement. In this regard, more than 1 pin (for example, 32 pins) may be required to determine a status signal (for example, RDY/BSY) from a particular channel.

In one example, a flash memory controller may be configured to watch all pins independently, however, providing multiple pins on a chip may be expensive as it adds to I/O requirements. In another example, all the pins in a channel may be wired together, however, in this configuration, it may be impossible to demarcate which die is providing a status. Multiplexing and using some sort of logic between status signals from multiple die may also be used, however, this mechanism may not be the most efficient means for providing the status of an individual die that the SSD is interested in. In a further example, the return status may be implemented on a shared data pin to save extra pin overhead while achieving the flash die status requirement. One caveat is that the SSD may need to implement a customized hardware and software mechanism, tailored to the flash memory specification, to be able to execute status command and process the return data.

The subject technology provides a solution that enables status signals from multiple die to be communicated with minimum pin requirements.

Figure 1:
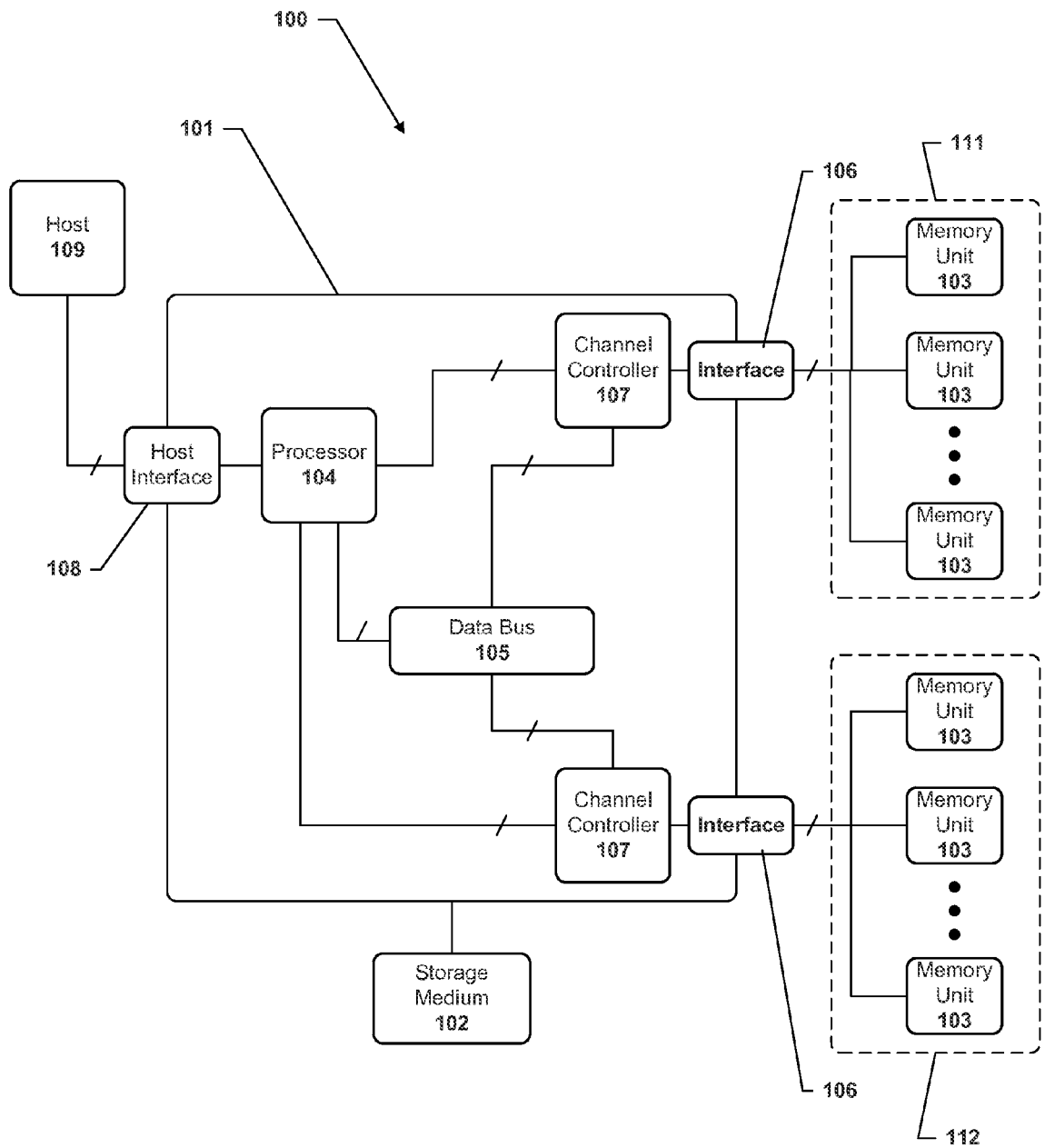
FIG. 1 is a block diagram illustrating example components of a data storage system for providing memory device readiness to a processor.

FIG. 1 is a block diagram illustrating example components of a data storage system according to one aspect of the subject technology. As depicted in FIG. 1, data storage system 100 (for example, a solid state drive) includes data storage controller 101, storage medium 102, and one or more groups of memory units 103 (for example, flash memory devices or die). Data storage controller 101 may use storage medium 102 for temporary storage of data and information used to manage data storage system 100. Data storage controller 101 may include several internal components, including, for example, one or more processors 104, a data bus 105, a read-only memory, one or more flash component interfaces 106 (for example, a multiplexer to manage instruction and data transport along a serial connection to memory unit 103) and respective channel controllers 107, a host input/output (I/O) interface 108, error correction circuitry, and the like. In some aspects, all of these elements of controller 101 may be integrated into a single chip. In other aspects, these elements may be separated into respective components or chips.

Processor 104 is configured to execute code or instructions to perform the operations and functionality described herein, manage request flow and address mappings, and to perform calculations and generate commands. Processor 104 may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on ROM within data storage controller 101 and/or processor 104. One or more sequences of instructions may be software stored and read from storage medium 102, memory unit 103, or received from host device 109 (for example, via host interface 108). ROM, storage medium 102, memory unit 103, represent examples of machine or computer readable media on which instructions/code executable by data storage controller 101 and/or processor 104 may be stored. Machine or computer readable media may generally refer to any non-transitory medium or media used to provide instructions to data storage controller 101 and/or processor 104, including both volatile media, such as dynamic memory used for storage media 102 or for buffers within data storage controller 101, and non-volatile media, such as electronic media, optical media, and magnetic media.

In some aspects, data storage controller 101 is configured to store data received from host device 109 in one or more memory units 103 in response to a write command from the host device. Data storage controller 101 may be further configured to read data stored in the one or more memory units 103 and to transfer the read data to host device 109 in response to a read command from the host device. Host device 109 represents any device configured to be coupled to data storage system 100 and to store data in data storage system 100. Host device 109 may, for example, be a computing system such as a personal computer, a server, a workstation, a laptop computer, PDA, smart phone, and the like. Alternatively, host device 109 may be an electronic device such as a digital camera, a digital audio player, a digital video recorder, and the like.

In some aspects, storage medium 102 represents volatile memory used to temporarily store data and information used to manage data storage system 100. According to one aspect of the subject technology, storage medium 102 is random access memory (RAM) such as double data rate (DDR) RAM. Other types of RAM also may be used to implement storage medium 102. Memory 102 may be implemented using a single RAM module or multiple RAM modules. While storage medium 102 is depicted as being distinct from data storage controller 101, those skilled in the art will recognize that storage medium 102 may be incorporated into data storage controller 101 without departing from the scope of the subject technology. Alternatively, storage medium 102 may be a non-volatile memory such as a magnetic disk, flash memory, peripheral SSD, and the like.

As further depicted in FIG. 1, host interface 108 may be configured to be operably coupled to host device 109, to receive data from the host device and to send data to host device. Host interface 108 may include both electrical and physical connections for operably coupling the host device to data storage controller 101, for example, via host interface 108. The host interface may be configured to communicate data, addresses, and control signals between the host device and data storage controller 101. Alternatively, host interface 108 of data storage controller 101 may include and/or be combined with host interface 108. Host interface 109 may be configured to implement a standard interface, such as Serial-Attached SCSI (SAS), Fiber Channel interface, PCI Express (PCIe), SATA, USB, and the like. Host interface 109 may be configured to implement only one interface. Alternatively, host interface 109 may be configured to implement multiple interfaces, which are individually selectable using a configuration parameter selected by a user or programmed at the time of assembly. Host interface 108 may include one or more buffers for buffering transmissions between host device 109 and data storage controller 101.

Data storage system 100 may include one or more channels of memory units 103. In this regard, data storage controller 101 may include one or more channel controllers 105 to facilitate determining the readiness of one or more memory units 103. A channel controller 107 may be operatively connected to a processor 104 and a data bus 105. Processor 104 may be configured to monitor one or more channels (for example, two) of memory units 103, and to marshal data sent to and received from the memory units on an active channel. In the depicted example, processor 104 is part of data controller 101. However, without limitation, the features and/or functionality of data controller 101 and processor 104 may be implemented as a single component or distributed among a group of components. Accordingly, data storage controller 101 may include the same or similar features and/or functionality of processor 104, and vice versa. Accordingly, data storage controller 101 and processor 104, as used herein, may be interchangeable for the purposes of describing the features and/or functionality of the subject technology.

In many flash memory architectures, one limitation has been that, although a memory unit 103 may be read or programmed one byte or word at a time, the memory unit may only be erased a "block" at a time. Moreover, a byte must be in an erased state before it may be programmed. An erase operation performed on a memory unit 103, however, may take a considerable amount of time (for example, about 10 milliseconds) compared to a read operation (for example, 80-100 microseconds) or a program operation (for example, 1.5 milliseconds), or other operations that may be performed by processor 104. Before processor 104 issues a command to a memory unit to perform a memory operation, processor 104 may determine the status of the memory unit. Determining the status of a memory unit 103 may include sending a request signal to the memory unit and waiting for a response. Consequently, after an erase cycle, determining whether a particular memory unit 103 is ready to accept a new operation from processor 104 may require an undesirable expenditure of clock cycles by processor 104 to repeatedly poll the memory unit for status.

As in the depicted example, channel controller 107 shares data bus 105 with processor 104. Without limitation, in some implementations, channel controller 107 may be connected in series between processor 104 and data bus 105. Contrary to other solutions in which a data storage controller or processor is responsible for determining whether a memory unit is busy, channel controller 107 may be a dedicated piece of hardware configured to perform the determination on behalf of the data storage controller or processor, thereby enabling the data storage controller or processor to conduct other operations on other flash memories, for example, on a different channel. In the depicted example, channel controller 107 may periodically send a status request signal to designated memory units 103 on behalf of processor 104, and then send processor 104 an interrupt signal on receiving confirmation from one or more of the memory units that the one or more memory units are ready to receive further commands.

Memory units 103 may be organized into a group 111 of memory units. A group of memory units operably connects as a memory channel to a corresponding interface 106. Processor 104 may be operable to initiate one or memory commands to one or more selected memory units in group 111 via the memory channel. Communication (for example, sending of commands and receiving data) with a memory unit 103 may be accomplished by way of data bus 105, and/or other signal paths for controlling, and/or sending or receiving data to or from, the memory channel for the active memory unit. In this regard, channel controller 107 may be operable to receive, from processor 104 a request for a status of one or more memory units 103. For example, after an erase cycle is initiated on a selected memory unit 103, processor 104 may program channel controller 107 to periodically poll the selected memory unit and signal processor 104 when the selected memory unit is in the ready state. Processor 104 may then perform operations on other memory units, without having to periodically return to the selected memory unit to determine whether the erase cycle has completed. While the selected memory unit is busy, processor 104 may perform or initiate one or more read, write, or erase operations on other memory units without significant delay between actions. Processor 104 may execute one or more commands related to one or more other memory units in, for example, a different group 112 of memory units 103.

Meanwhile, channel controller 107 will periodically poll the selected memory unit on behalf of processor 104 to determine when the selected memory unit has returned to a "ready" state. On determining that the selected memory unit is in a ready status, channel controller 107 provides the ready status to the processor 104. The ready status may be provided, for example, by sending an interrupt signal to processor 104, and processor 104, on receiving the signal, querying channel controller 107 for the ready status. As will be described further, channel controller 107 may signal processor 104 when more than one memory unit 103 is in a ready state, and provide the identity of each ready memory unit to processor 104 on request.

Each memory unit 103 represents a non-volatile memory device for storing data. According to one aspect of the subject technology, a memory unit 103 includes, for example, a NAND flash memory. A memory unit 103 may include a single flash memory device or chip, or may include multiple flash memory devices or chips arranged in multiple channels. Memory units 103 are not limited to any particular capacity or configuration. For example, the number of physical blocks, the number of physical pages per physical block, the number of sectors per physical page, and the size of the sectors may vary within the scope of the subject technology.

Memory units 103 may have a standard interface specification. This standard ensures that chips from multiple manufacturers can be used interchangeably (at least to a large degree). The interface may further hide the inner working of the memory unit and return only internally detected bit values for data. The interface of a memory unit 103 may be used to access one or more internal registers and an internal flash controller. In some aspects, the internal registers may include address, command, control, and/or data registers, which internally retrieve and output the necessary data to and from a NAND memory cell array. For example, a data register may include data to be stored in the memory array, or data after a fetch from memory array, and may also be used for temporary data storage and/or act like a buffer. An address register may store the memory address from which data will be fetched to the host or the address to which data will be sent and stored. In some aspects, a command register may be included to control parity, interrupt control, and/or the like. In some aspects, the internal flash controller may be accessible via a control register to control the general behavior of memory unit 103. The internal flash controller and/or the control register may control the number of stop bits, word length, receiver clock source, and may also control switching the addressing mode, paging control, coprocessor control, and the like.

In some aspects, the internal registers of memory unit 103 may include a test register. The test register may, for example, be accessed by specific addresses and/or data combinations provided at the interface of memory unit 103 (for example, by specialized software provided by the manufacturer to perform various tests on the internal components of the memory unit). The test register may be used to access and/or modify other internal registers, for example, the command and/or control registers. In some aspects, test modes accessible via the test register may be used to input or modify certain programming conditions of memory unit 103 (for example, erase parameters) to dynamically vary how data is programmed or erased from the memory cells of the memory arrays.

Figure 2:
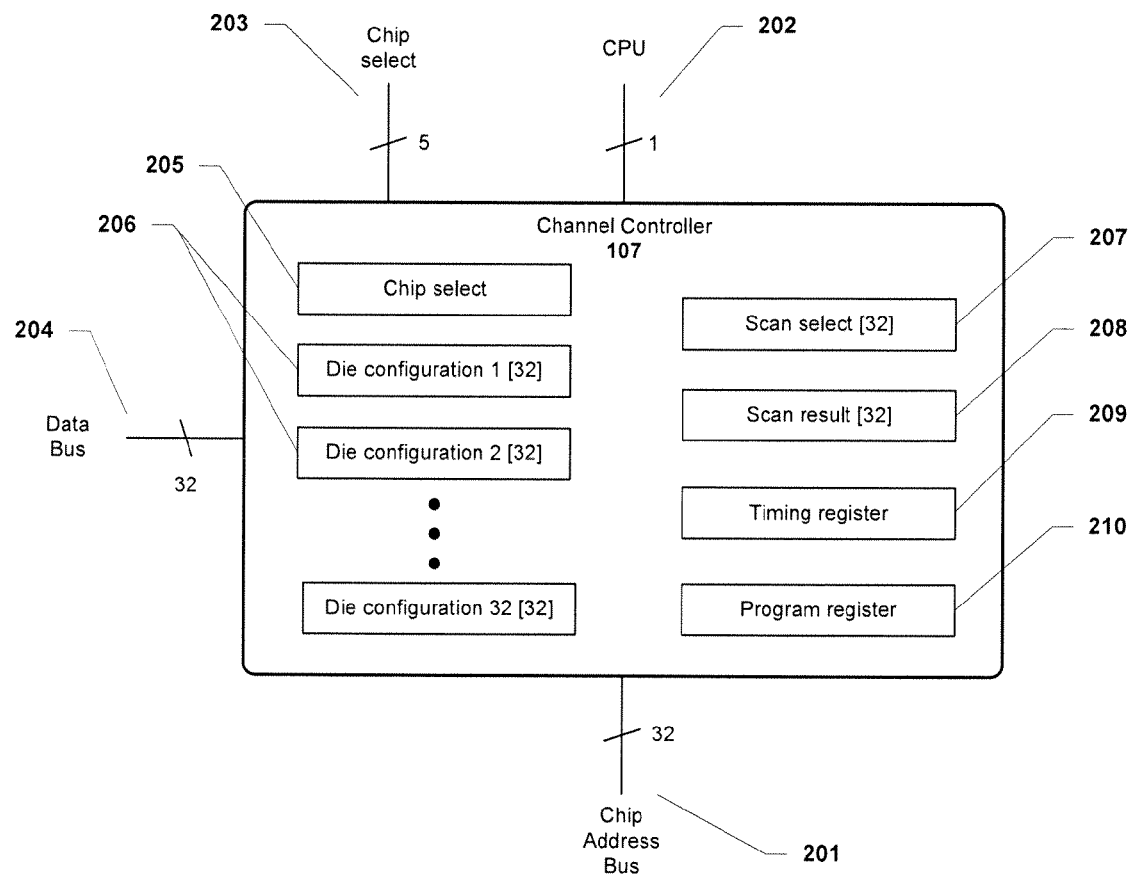
FIG. 2 is a block diagram illustrating an example channel controller.

FIG. 2 is a block diagram illustrating an example channel controller according to one aspect of the subject technology. Channel controller 107 may include a group of data connections (for example, implemented as pins on a die), including, a chip address bus connection 201 for communicating with one or more memory units 103 associated with controller 107, and a CPU alert connection 202, chip select bus connection 203, and a data bus connection 204, for communicating with a flash memory controller (for example, with processor 104).

Channel controller 107 may further include a plurality of internal registers, accessible by one or more of the previously described group of data connections. For example, chip select connection 203 may be used (for example, by processor 104) to program a chip select register 205 for selection of a memory unit 103, while data is provided to data bus connection 204 to provide channel controller 107 configuration information related to the selected memory unit 103. Channel controller 107 may also include a group of configuration registers 206, each corresponding to a respective memory unit 103. A configuration register 206 may be programmed to instruct channel controller 107 how the selected memory unit 103 is physically connected to data controller 101. For example, a circuit board may be configured with a wiring (pin) configuration for interfacing with memory units from multiple manufacturers. A memory unit 103 interfaces with this wiring configuration (for example, be plugged in to these wires), and the corresponding configuration register 206 describes the physical arrangement of the wiring configuration (including, for example, the physical attributes of each memory pin) so that processor 104 and/or channel controller 107 understands how to communicate with and send control signals to the memory unit. For example, configuration register 206 may tell channel controller 107 to use a certain pin of a corresponding memory unit 103 for "chip enable," certain pins for "read," and the like.

Each channel controller 107 periodically scans one or more memory units 103 (for example, sends a status request signal) to determine a status of the scanned memory units. In one aspect, a scan select register 207 is provided to determine which memory units 103 of a group associated with channel controller 107 are designated to be scanned by channel controller 107. For example, scan select register 207 may include 32 bits, with each bit representative of one of 32 memory units 103 operably connected to channel controller 107. Accordingly, processor 104 may program scan select register 207 to designate one or more memory units 103 to be scanned by channel controller 107. On programming a selected bit, the memory unit 103 corresponding to the bit location is scanned by channel controller 107 during a subsequent scanning period. Scan register may be programmed via data at data bus connection 204.

Once scan select register 207 has been programmed, channel controller 107 may periodically poll the selected memory units 103 designated by the register. On determining that a respective memory unit 103 is active and ready, channel controller 107 may set a result register 208. In some aspects, the information returned from the ready memory unit 103 may be copied into result register 208. On setting result register 208, channel controller 107 may send an interrupt signal to processor 104 to inform processor 104 that one or more memory units 103 are in a ready state. For example, channel controller 107 may signal processor 104 that a status signal has been received by the channel controller 107, and then wait for processor 104. Processor 104, on receiving the interrupt signal, may complete or interrupt other operations in process and retrieve the data in result register 208 to determine which memory units are in a ready state. In this manner, processor 104 may determine the status of memory unit 103 without accessing memory unit 103.

Channel controller 107 may further include an internal timing register 209. Timing register 209 may include a counter for determining how many clock cycles to wait between consecutive scans. The timer may further determine how long to wait before control is taken away from the timer. Once the timer starts, channel controller 107 may scan each memory unit 103 designated to be scanned. In one example, channel controller 107 initiates a scan of each of the memory units represented by a non-zero bit in scan register 207, and then restarts the timer. When the timer expires, it goes down the line again. When a scan is completed, and before the timer has expired, channel controller 107 may be available to communicate with other components of data storage system 100, for example, to inform processor 104 that a memory unit is ready. Alternatively, the timer may be used to determine a pause between successive scans.

In one aspect, while channel controller 107 scans the memory units it also may make sure that the bus is not used, especially in implementations where there is only one bus running to all memory units. Before channel controller 107 accesses the bus it may determine the bus is idle, then access it. Even so, the time value set at timing register 209 is such that it should be enough to complete scanning of all memory units designated by scan register 207.

In some aspects, channel controller 107 may include a general program register 210. Bits programmed (or not programmed) within register 210 may determine various functions of how channel controller 107 interacts with memory units 103. For example, a group of bits (for example, bit positions 0 to 7) may determine the number of memory units that will be scanned before channel controller 107 itself enters a ready state or signals processor 104. If, for example, fifteen memory units 103 are designated by scan select register 207 to be scanned, and general programming register 210 designates that only four memory units 103 are to be scanned at a time, then channel controller 107 will scan the first four memory units of the fifteen that were designated and return to idle. After the timer starts again, channel controller 107 will continue the scan at the fifth memory unit designated in scan select register 207, scanning four more memory units.

Additionally or in the alternative, program register 210 may include one or more bits to designate how many memory units must be in a "ready" state before returning an interrupt to processor 104. For example, register 210 may instruct channel controller 107 to return an interrupt after the first "ready" memory unit is found, return an interrupt after a predetermined number of "ready" memory units are found, or return an interrupt at the completion of a scan if one or more memory units are in the ready state.

The subject technology enables processor 104 to configure channel controller 107 to scan a designated memory unit 103, and then go execute another command while channel controller 107 is performing the scan. Channel controller 107 may send commands, interact with the other memory units, get data back, and the like. When the designated memory unit 103 is ready, channel controller 107 may write data to result register 208 based on whatever status was reported by designated memory unit 103. In this manner, channel controller 107 may inform a related processor 104 which memory unit reported that it is ready in connection with information directly reported by the memory unit.

Figure 3:
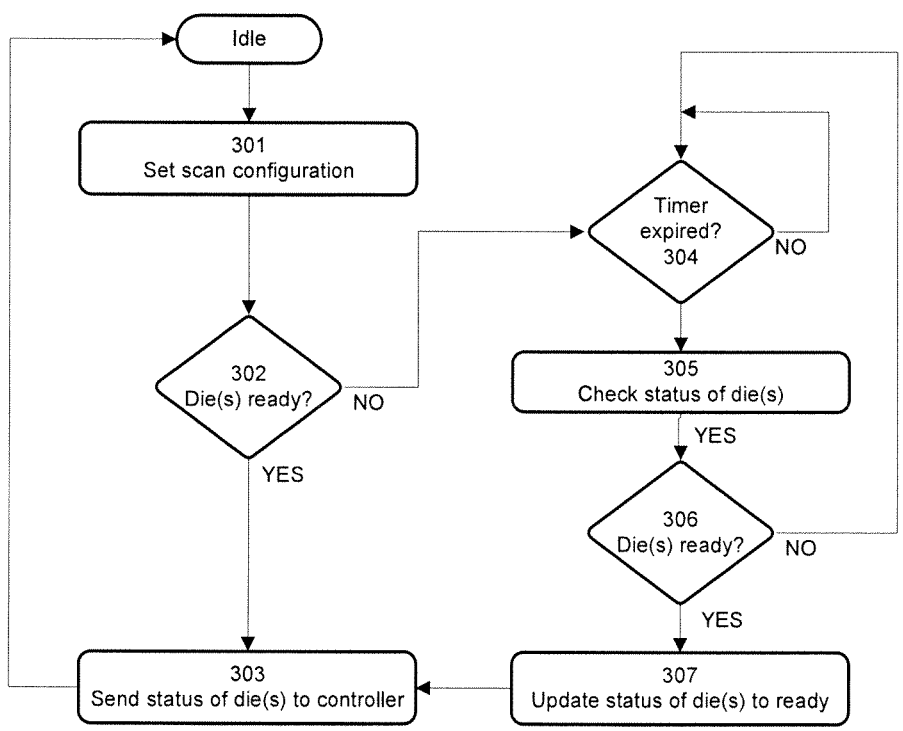
FIG. 3 is a flowchart illustrating a first example method for providing memory device readiness to a memory controller.

FIG. 3 is a flowchart illustrating a first example method for providing memory device readiness to a memory controller (for example, data storage controller 101 or components thereof). The method may be performed, for example, by way of commands sent by the memory controller to program one or more selected channel controllers, and subsequent communications between the selected channel controllers and one or more memory units (for example, flash memory die) to determine a status of the memory units on behalf of the memory controller.

During SSD operations, the memory controller may initiate one or more memory commands (for example, an erase command) to one or more selected memory units in a first group of memory units. In step 301 of the example method, the memory controller sets the scan configuration of a channel controller. The channel controller may be operably connected between the memory controller and the first group of memory units. In this example step, the channel controller receives, from the memory controller, a request for a status of the one or more memory units. For example, the memory controller may set one or more selected bits at scan select register 207 to configure the channel controller to initiate status checks of memory units corresponding to the selected bits. The memory controller may further configure other registers of the channel controller, including chip select register 205, timing register 209, and program register 210.

In step 302, the channel controller determines whether the memory unit is ready. For example, this may include reading scan result register 208 to determine if the memory unit has reported a ready status. On determining that the one or more memory units are in a ready status, in step 303, the ready status is provided to the memory controller. If the memory unit is not in the ready state, the channel controller may periodically determine the status of the one or more memory units without further interaction from the memory controller, permitting the memory controller to execute one or more other commands related to one or more other memory units in a different group of memory units.

As described previously, timing register 209 may determine the polling period by which the channel controller scans the memory units designated in scan select register 207. In step 304, the channel controller waits until the timer has expired before conducting a scan of the memory units. On expiration of the timer, in step 305, the channel controller initiates a scan of the memory units. In step 306, the channel controller polls a memory unit to determine whether the memory unit is in a ready or busy status. If the memory unit is busy, then steps 304 to 306 are repeated. If the memory unit is ready, then in step 307, the channel controller updates the status of the memory unit to ready and provides the status of the memory unit to the memory controller. In this regard, providing the status may include updating a register within the channel controller (for example, scan select register 208) or a register associated with the memory controller. Scan select register 207 may also be updated to omit the memory unit who returned a ready status to preclude further scanning of the memory unit on further iterations. In some aspects, steps 304 to 306 may be repeated until all designated memory units selected for scanning are in the ready state.

Figure 4:
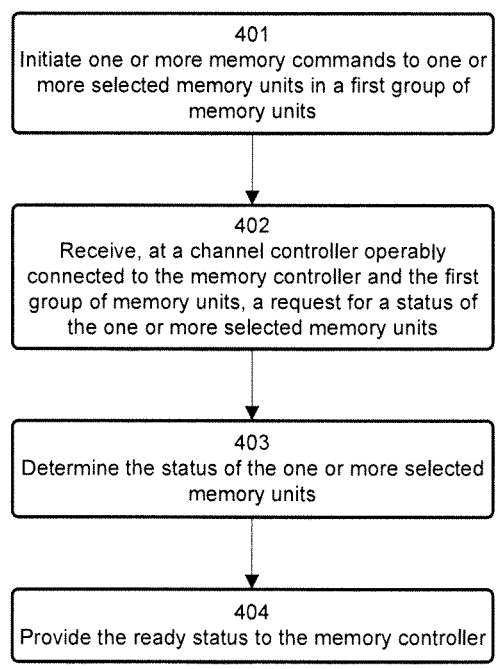
FIG. 4 is a flowchart illustrating a second example method for providing memory device readiness to a memory controller.

FIG. 4 is a flowchart illustrating a second example method for providing memory device readiness to a memory controller according to some aspects of the subject technology. According to some aspects, the blocks of FIG. 4 may be executed by one or more computing devices (for example, data storage controller 101 or components thereof). The method may be performed, for example, by way of commands sent a the memory controller and a channel controller and one or more memory devices (for example, flash memory die). In this regard, the blocks of FIG. 4 may be performed within the context of SSD operations.

In block 201, the memory controller initiates one or more memory commands to one or more selected memory units in a first group of memory units (e.g., one or more flash memory devices). In some aspects, the one or more memory commands may include a command to perform an erase operation on the one or more selected memory units, the erase operation causing the one or more selected memory units to be in a busy state.

In block 202, a channel controller that is operably connected to the memory controller and the first group of memory units receives a request for a status of the one or more selected memory units. Receiving the request may include, for example, receiving an instruction (e.g., from a component of the memory controller) to poll the one or more selected memory units to determine when at least one of the one or more selected memory units are in a ready state.

In block 203, the channel controller determines the status of the one or more selected memory units. In this regard, the status is determined while the memory controller is permitted to execute one or more other commands related to one or more other memory units in a different group of memory units.

In block 204, on determining that the one or more memory units are in a ready status, the ready status is provided (e.g., by the channel controller) to the memory controller. In some implementations the ready status may be provided by sending the ready status to a component of the memory controller. In other implementations, the channel controller may receive an indication (e.g., from the memory units), in response to the request for the status, that at least one of the memory units are in a ready state. Accordingly, providing the ready status may include sending an interrupt signal to the processor in response to receiving the indication, receiving a subsequent request from the process for a scan status, and providing the ready status in response to the request for the scan status.

The previously described aspects and other aspects may provide one or more advantages, including, but not limited to, enabling a processor responsible for data communication with one or more groups of memory to conduct other operations while a memory device is busy, saving the processor the time required for polling the memory device to determine status.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

The invention claimed is:

1. A method for providing memory device readiness the method comprising:
   initiating, by a processor of a memory controller, one or more memory commands to one or more selected memory units in a first group of memory units of a plurality of groups of memory units, the groups of memory units being operably connected to the processor by a plurality of respective channel controllers distinct from the processor and the plurality of groups of memory units;
   sending, from the processor, to a selected one of the plurality of respective channel controllers operably connected to and between the processor and the first group of memory units, a request for a status of the one or more selected memory units;
   determining, by the selected channel controller in response to the request from the processor, the status of the one or more selected memory units, the status being determined while the processor is permitted to execute one or more other commands related to one or more other memory units in a different group of memory units; and
   on determining that the one or more selected memory units are in a ready status, providing, by the selected channel controller, the ready status to the processor.

2. The method of claim 1, wherein determining the status of the one or more selected memory units comprises:
   initiating, by the selected channel controller, a scan of the one or more selected memory units to determine if the one or more selected memory units are in a ready state.

3. The method of claim 2, further comprising:
   if the one or more selected memory units are not in the ready state then periodically scanning the one or more selected memory units without further interaction from the processor.

4. The method of claim 2, further comprising:
   receiving, at the selected channel controller, one or more signals to set a timer at the selected channel controller, the timer determining a period between an initiation of subsequent scans.

5. The method of claim 1, wherein the one or more selected memory units are selected by determining one or more corresponding bits set in a scan select register of the selected channel controller.

6. The method of claim 5, wherein determining the status of the one or more selected memory units comprises determining that the one or more selected memory units are in a ready state, the method further comprising:
   clearing the one or more corresponding bits in the scan select register to prevent further determining of the one or more selected memory units without a further configuration of the scan register.

7. The method of claim 1, wherein providing the ready status comprises:
   sending, to the processor, an interrupt signal; and
   providing, in a scan result register, the ready status to the processor.

8. The method of claim 1, further comprising:
   initiating, by the processor, one or more commands related to the one or more other memory units in the different group of memory units.

9. The method of claim 1, wherein the one or more selected memory units comprise one or more flash memory devices.

10. The method of claim 1, wherein the one or more memory commands comprises a command to perform an erase operation on the one or more selected memory units, the erase operation causing the one or more selected memory units to be in a busy state, and wherein the step of receiving a request comprises receiving an instruction to poll the one or more selected memory units to determine when at least one of the one or more selected memory units are in a ready state, the method further comprising:
   initiating, by the memory controller, a command to perform a read or write operation on the one or more other memory units;
   receiving, at the processor, an interrupt signal from the selected channel controller;
   querying the selected channel controller to determine that the erase operation is completed; and
   on determining that the erase operation is completed, initiating a command to perform a subsequent operation on the one or more selected memory units.

11. A system, comprising:
   a plurality of groups of memory units;
   a plurality of channel controllers, each channel controller connected to a respective one of the groups of memory units; and
   a processor connected to the groups of memory units via the plurality of channel controllers,
   wherein each channel controller is distinct from the plurality of groups of memory units and the processor and operable to:

receive a request sent to the channel controller from the processor, the request being for a status of one or more selected memory units in a first group of memory units of the plurality of groups of memory units;

determine the status of the one or more selected memory units in response to the request from the processor, the status being determined while the processor is permitted to execute one or more other commands related to one or more other memory units in a different group of memory units; and on determining that the one or more selected memory units are in a ready status, provide the ready status to the processor.

12. The system of claim 11, wherein the channel controller is further operable to:

receive one or more configuration commands for configuring the channel controller to determine the status of the one or more selected memory units;

initiate the request for the status without further interaction from the processor; and receive an indication, in response to the request, that at least one of the one or more selected memory units are in a ready state.

13. The system of claim 12, wherein the channel controller being operable to provide the ready status comprises the channel controller being operable to:

send an interrupt signal to the processor in response to receiving the indication;

receive, from the processor, a request for a scan status; and provide the ready status in response to the request for the scan status.

14. The system of claim 13, wherein the interrupt signal is sent after a predetermined number of the one or more memory units are in the ready state.

15. The system of claim 12, wherein the one or more requests are periodically initiated by the channel controller until the indication is received.

16. The system of claim 12, wherein the request is periodically initiated based on a timer configuration previously set at the channel controller.

17. The system of claim 12, wherein the channel controller is further operable to:

in response to receiving the indication, preclude further status requests to the at least one of the one or more selected memory units.

18. The system of claim 11, wherein the one or more selected memory units comprise one or more flash memory die.

19. The system of claim 11, wherein the channel controller is further operable to:

receive one or more configuration commands for configuring the channel controller with one or more physical attributes of the one or more selected memory units; and communicate with the one or more selected memory units based on the configured one or more physical attributes.

20. A non-transitory machine-readable medium having instructions stored thereon that, when executed by a processor, perform a method for providing memory device readiness to a memory controller, the method comprising:

initiating, by a processor, one or more memory commands to one or more selected memory devices in a first group of memory devices of a plurality of groups of memory units, the groups of memory units being operably connected to the processor by a plurality of respective channel controllers distinct from the processor and the plurality of groups of memory units;

sending, from the processor, to a selected one of the plurality of respective channel controllers operably connected between the processor and the first group of memory devices, a request for a status of the one or more selected memory devices;

determining, by the selected channel controller in response to the request from the processor, the status of the one or more selected memory devices, the status being determined while the processor is permitted to execute one or more other commands related to one or more other memory devices in a different group of memory devices; and on determining that the one or more selected memory devices are in a ready status, providing, by the selected channel controller, the ready status to the processor.

* * * * *